United States Patent

Douglas

[15] 3,641,574
[45] Feb. 8, 1972

[54] RADAR RANGEMARK CALIBRATOR

[72] Inventor: Robert D. Douglas, 298 Coral Way, Jacksonville Beach, Fla. 32250

[22] Filed: Mar. 16, 1970

[21] Appl. No.: 19,975

[52] U.S. Cl. .........................................................343/17.7
[51] Int. Cl. .........................................................G01s 7/40
[58] Field of Search ............................................343/17.7

[56] References Cited

UNITED STATES PATENTS

| | | | |
|---|---|---|---|
| 2,602,140 | 7/1952 | Fink | 343/17.7 UX |
| 2,941,151 | 6/1960 | Goldbohm et al. | 343/17.7 UX |
| 3,206,684 | 9/1965 | Der et al. | 343/17.7 X |
| 3,374,481 | 3/1968 | Lupinetti | 343/17.7 |

Primary Examiner—T. H. Tubbesing
Attorney—George H. Baldwin and Arthur G. Yeager

[57] ABSTRACT

A calibrator for a radar system calibrated in standard distance units including an oscillator producing analog signals having a frequency of oscillation of a whole digit ratio to a predetermined number of whole standard distance units, a squaring amplifier converting the analog signals to digital signals, and digital logic means for scaling down the digital signals into a plurality of digital outputs differing in a plurality of whole number multiples of the frequency of oscillation. A switch selectively completes the circuit from the logic means to an amplifier which amplifies selected digital outputs to provide the plurality of video rangemark pulses. The digital logic means also includes a selectable preset counter for further scaling down the scaled down digital outputs into a plurality of other digital outputs differing in a plurality of whole number multiples of the frequency of oscillation. A switch selectively sets the counter to feed a selected other digital output to a trigger repetition generator which generates a plurality of trigger repetition pulses for feeding into an amplifier. Delay means are also incorporated in the digital logic means for selectively delaying some of the digital outputs.

10 Claims, 4 Drawing Figures

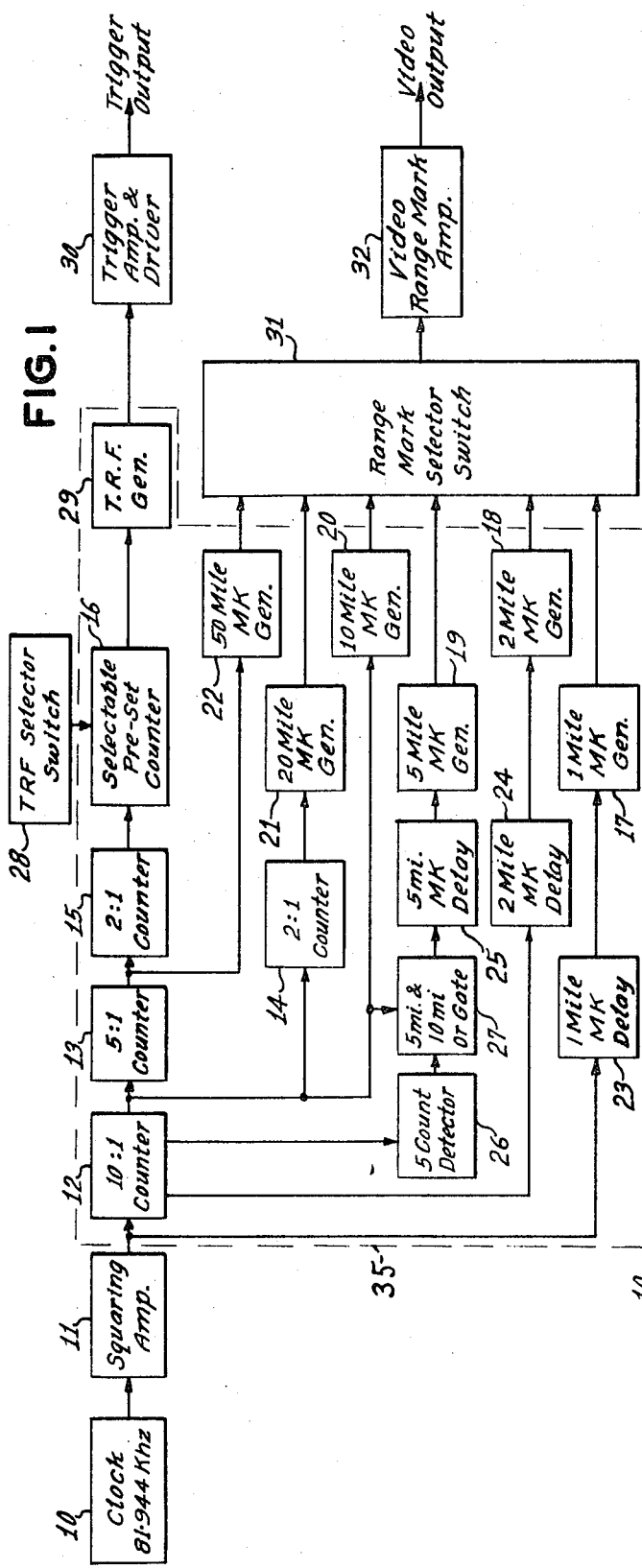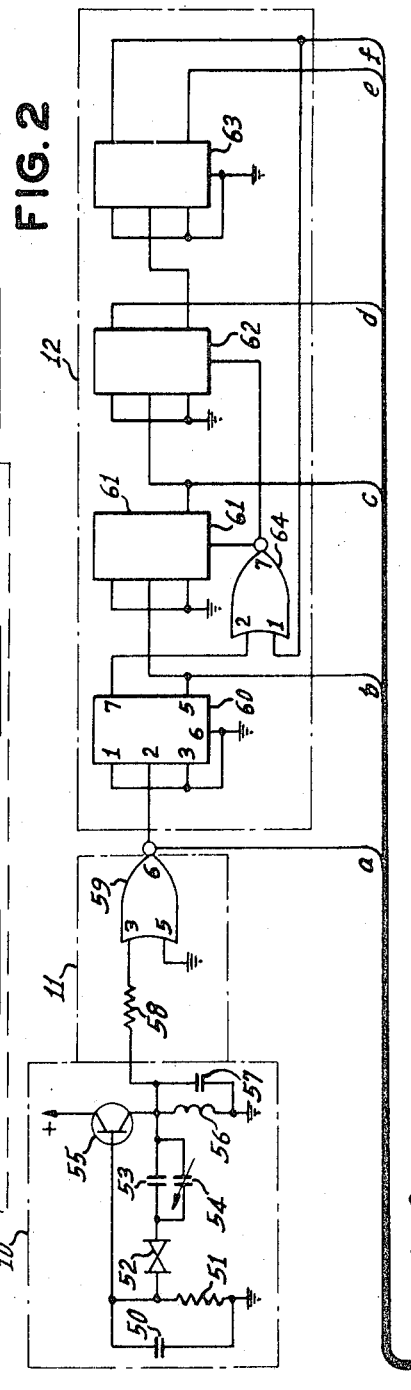

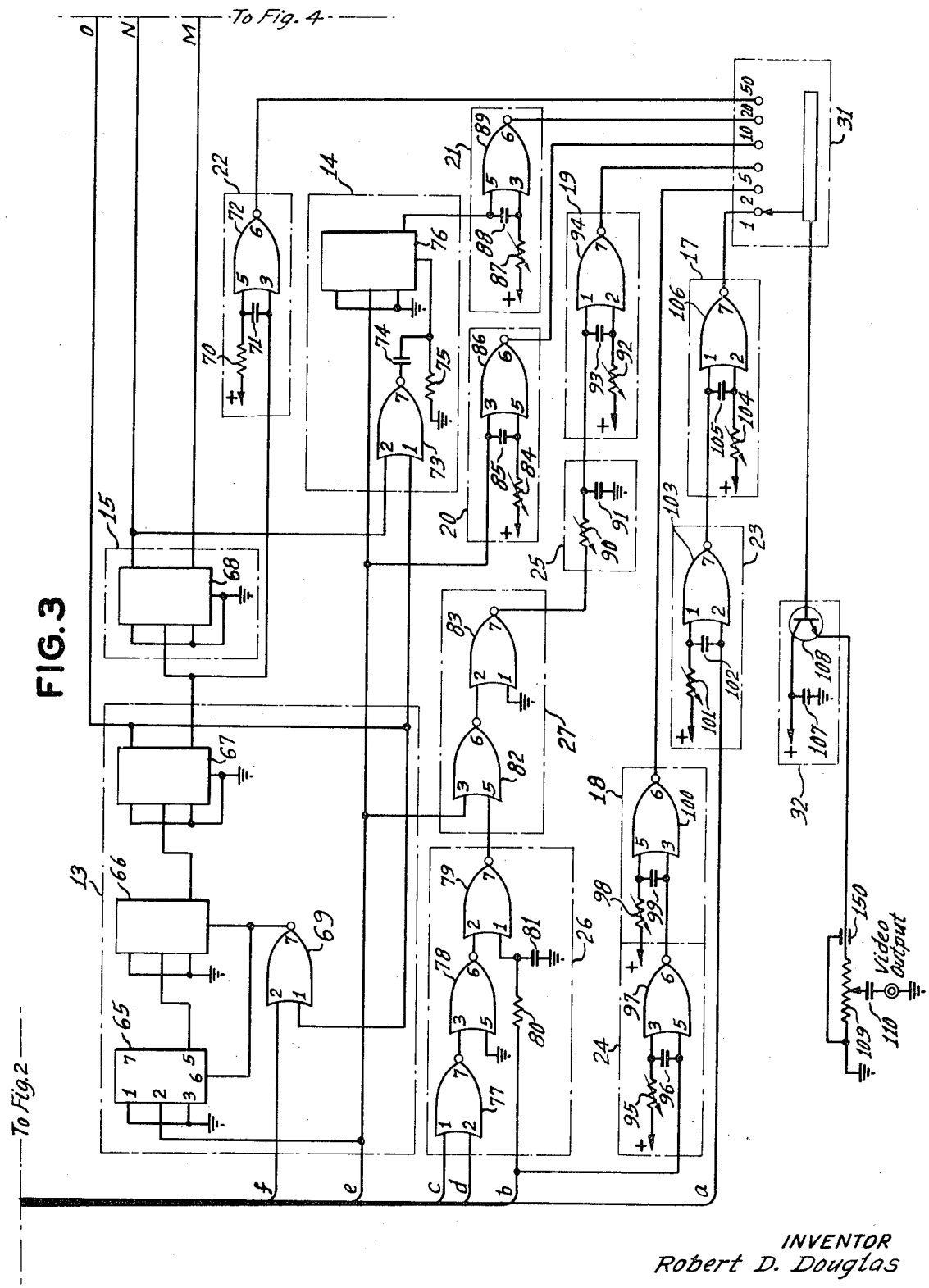

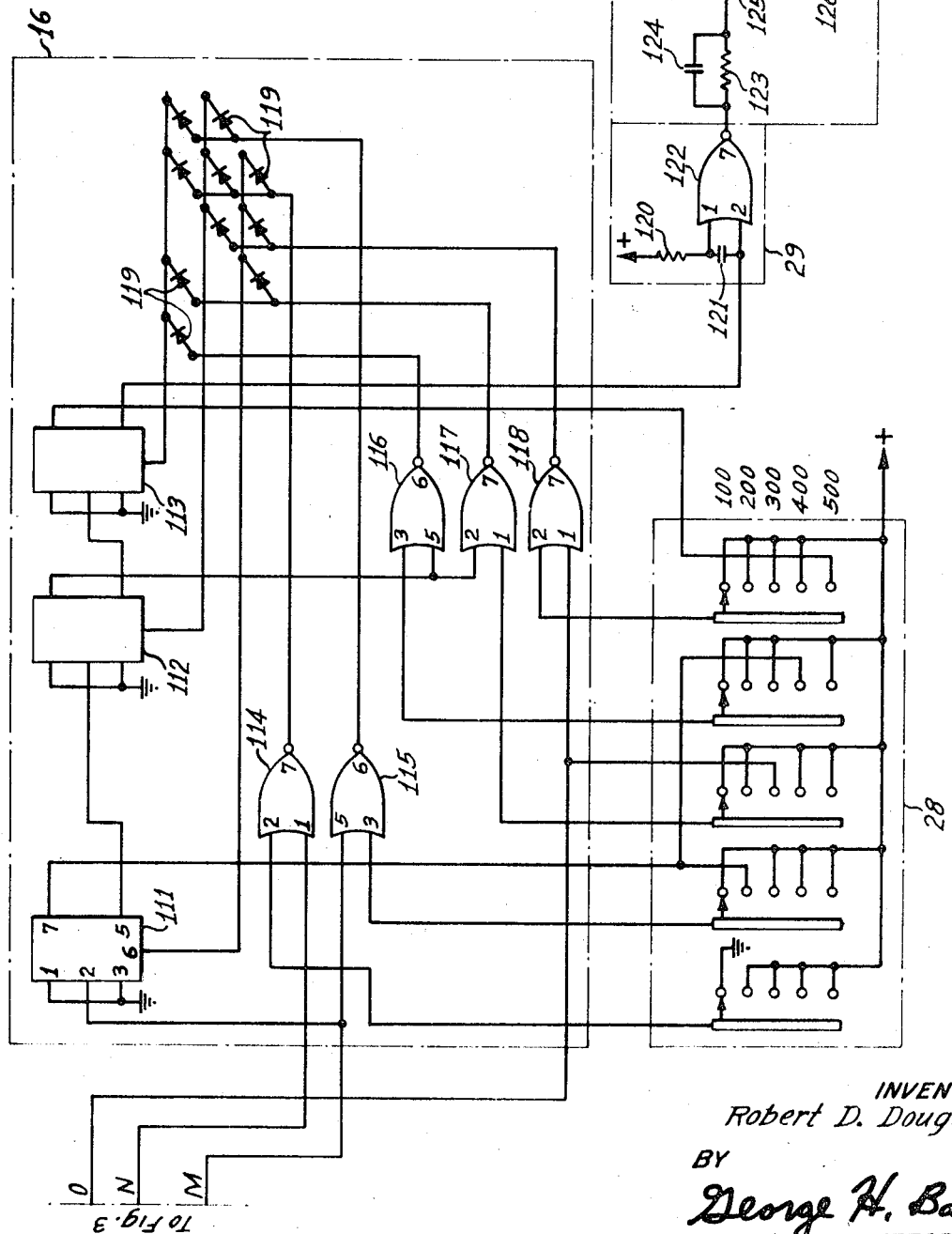

3,641,574

RADAR RANGEMARK CALIBRATOR

BACKGROUND OF THE INVENTION

1. Field of the Invention

This invention relates to radar rangemark calibrators and more particularly to such calibrators having a stable oscillator producing analog signals which are then converted into digital signals for operation of the digital logic means whereby very stable trigger repetition frequency pulses and video rangemark pulses are derived.

2. Description of the Prior Art

Prior art radar range calibrating units have many problems including the instability and self-calibration difficulties inherent in such units which employ components, such as free-running blocking oscillators, astable synchronized multivibrators, regenerative frequency dividers, and other synchronous components which operate even after a loss of input synchronizing pulses which results in erroneous output pulses to calibrate a radar system. Due to the critical nature of proper calibration and maintaining circuit parameters constant in the prior art units, the synchronous components thereof generally will continue to operate unlocked or in a nonsynchronous mode, even without the loss of input synchronizing pulses, resulting in erroneous output pulses and compounding the technician's difficulties in maintaining and calibrating the radar systems.

The aforementioned problems are substantially reduced or eliminated by the hereinafter described invention, particularly since all of the digital logic means are bistable in all of the scaling down or counting functions, which cease to operate in the event of failure therein, such cessation being readily detected by the technician. In the event of failure in the stable oscillator, no video rangemarks or trigger repetition pulses are generated for erroneous radar range calibration.

Among prior art patents considered in the filing of this application was U.S. Pat. No. 2,941,151 which was believed to be more pertinent than other patents found in the search of the present invention.

SUMMARY OF THE INVENTION

In accord with the invention, a calibrator for calibrating a radar system set in nautical or statute mile, kilometer or the like standard distance units is provided which produces a plurality of video rangemark pulses and a plurality of trigger repetition pulses. The calibrator includes a stable oscillator producing analog signals having a frequency of oscillation of a whole digit ratio to a predetermined number of whole radar standard distance units and first means to convert the analog signals to digital signals. Digital logic means receive the digital signals from the first means and scales down same into a plurality of digital outputs differing in a plurality of whole number multiples of the frequency of oscillation. A first selective switch means completes the circuit between the logic means and a video rangemark means for receiving and amplifying selected digital outputs to provide a plurality of video rangemark pulses. The digital logic means incorporates a second means for selectively scaling down the digital signals into a plurality of other digital outputs differing in a plurality of whole number multiples of the frequency of oscillation and a trigger generating means receives selected other digital outputs from the second means and generates a plurality of trigger repetition pulses in response thereto, which are thereafter amplified by a trigger repetition frequency means. A second selective switch means completes the circuit between the second means and the trigger generating means for passing selected other digital outputs to the latter.

Other aspects of the invention include delay means between the logic means and the video rangemark means for delaying some of the video rangemark pulses so that they occur coincidentally with the leading edges of the trigger repetition pulses. The second means of the digital logic means is defined by a selectable preset counting means which provides a predetermined different scaled down digital output dependent on the second selective switch means.

Further detailed aspects of the invention are the utilization of a 10:1 counter as a portion of the digital logic means for deriving a pair of differently scaled down series of digital signals therefrom. Also a five-count detector coupled to a 5 and 10 OR gate derives another and different series of scaled down signals from the 10:1 counter which occur at a rate between the rates of the pair of differently scaled down series of digital signals.

A general object of this invention is to provide an improved radar rangemark calibrator.

A particular object is the provision of such a calibrator which is precise and reliable in its construction and during operation thereof.

Another particular object is to provide an improved calibrator which is unusually stable and which has relatively few critical self-calibration adjustments.

A specific object is the provision of such a calibrator in which jitter between the video rangemark pulses and the trigger repetition frequency pulses, and between any trigger pulse and a successive trigger pulse is eliminated.

Another specific object is to provide an improved calibrator which does not include components of the astable or synchronous character.

Other specific objects of the invention include the small size, weight and low heat generation of such calibrator due to the use of integrated micrologic circuits as well as solid-state components and circuitry.

BRIEF DESCRIPTION OF THE DRAWINGS

The novel features which are believed to be characteristic of this invention are set forth with particularity in the appended claims. The invention itself, however, both as to its organization and method operation, together with further objects and advantages thereof, may best understood by reference to the following description taken in connection with the accompanying drawings, in which:

FIG. 1 is a block diagram of the radar range calibrator in accord with the invention;

FIG. 2 is a detailed circuit diagram of the clock, squaring amplifier and 10:1 counter portions of the calibrator depicted in FIG. 1;

FIG. 3 is a detailed circuit diagram of the 5:1 counter and 2:1 counter portions together with other portions of the calibrator of FIG. 1 to produce the video rangemark pulses; and FIG. 4 is a detailed circuit diagram of the selectable preset counter, TRF selector switch portions together with other portions of the calibrator of FIG. 1 to produce the trigger repetition pulses.

DESCRIPTION OF THE PREFERRED EMBODIMENT

Referring now more particularly to FIG. 1, the clock 10 is a stable crystal oscillator of a modified Pierce-type configuration producing sinusoidal analog output signals which are fed to the squaring amplifier 11, amplifier 11 producing a square digital output, i.e., an output signal having sharp leading and trailing edges, for appropriately triggering the digital logic means, including the 10:1 counter 12 and the 1-mile mark delay 23 which in turn triggers the 1-mile mark generator 17.

The radar rangemark calibrator is for use with a radar system calibrated in nautical or statute mile, kilometer or the like standard distance units. The frequency of oscillation of the oscillator is a whole digit ratio of a predetermined number of whole radar standard distance units. In the embodiment shown, the frequency of crystal 52 of clock 10 is selected to be equivalent to the time period of 1 nautical radar mile derived from a velocity of propagation of 299.708 meters/$\mu$sec. one-way path or 327.764 yds./$\mu$sec. Based on 2,000 yds. per nautical mile times 2 (for a two-way path), the time period of 1 nautical radar mile is equivalent to 81.944 kHz. Thus, when rangemark selector switch 31 is manipulated to pass 1-mile rangemarks, the digital output pulses, from the clock 10 through squaring amplifier 11, delay 23 and generator 17, are passed through the video rangemark amplifier 32 for utilization in checking or adjusting the radar system, such as the well-known AN/SPA-8, AN/SPA-4, and AN/SPA-25, radar range repeaters of the United States Navy. Since the clock 10 operates at the basic frequency of one time period being equivalent to 1 nautical radar mile, the 10:1 counter 12 at the output of the first unpermuted binary stage 60 (FIG. 2) scales the clock output down by 2 for use in generating the 2-mile rangemark pulses through delay 24 and mark generator 18. Thus, the digital logic circuitry means, including counters 12, 13 and 14, detector 26 and gate 27, are effective to scale down the basic clock frequency 2:1, 5:1, 10:1, 20:1 and 50:1 to produce corresponding rangemark pulses representative of 2, 5, 10, 20 and 50 nautical miles, as will be hereinafter more fully explained in connection with FIGS. 2 and 3.

The output signals from counter 13 are scaled down from the basic clock frequency by counters 12 and 13 to 50:1 which is further scaled down by counter 15 additionally by 2:1 resulting in a total scale down of 100:1. By employment of the TRF selector switch 28 to select the scaled down outputs from the selectable preset counter 16, any of the following trigger repetition pulse rates may be obtained: 100, 200, 300, 400 and 500 miles, i.e., counter 16 may be selected for an output which produces a pulse train output whose frequency is scaled down from the basic clock frequency by 100:1, 200:1, 300:1, 400:1 or 500:1. The digital output from counter 16 triggers the trigger repetition frequency generator 29 which produces the trigger repetition pulses, such pulses being thereafter amplified by amplifier and driver 30 for utilization in checking and adjusting the radar system to be calibrated.

A more complete understanding of the radar range calibrator may be obtained by considering the circuit details embodied in FIGS. 2, 3 and 4 in which the sinusoidal analog input signals from oscillator 10 are connected to the squaring amplifier 11 for converting same into digital square wave signals in order to establish sharp leading and trailing edges to trigger the logic means, including the standard decade or 10:1 permuted binary scaler or counter 12 and the 1-mile mark delay 23. Since the logic components employed in this calibrator change state or are triggered by the negative going edges of the square wave signals, all time references will be considered with respect to the trailing edges of the signals or pulses thereafter produced in the circuit.

The square wave signal from amplifier 11 has a time period equivalent to 1 nautical radar mile or 12.203 μsec. This square wave signal is supplied to one-half of a dual two input NOR-gate 103 (see FIG. 3) connected to operate as an adjustable time delay by variable resistor 101 and capacitor 102. In accord with the standard rules of NOR logic, pin 1 of gate 103 is biased "Hi" through variable time delay resistor 101 whereby the quiescent output condition at pin 7 is "Low" or near ground potential. When a negative going or trailing edge of the square wave signal from squaring amplifier gate 59 is supplied to pin 2, and is coupled through capacitor 102 to pin 1, the output on pin 7 changes from its quiescent condition to "Hi" and remains in a "Hi" potential state for a period of time determined by the RC time constant of resistor 101 and capacitor 102. Thereafter, the state of pin 7 quickly returns to its quiescent state after the finite period of time, thus effecting a delay of the trailing edge by such time period. Delay gate 103 generates a distinct and separate pulse which merely in time appears additive to the initiating pulse from gate 59 and the trailing or negative edge is then utilized to actuate generator gate 106. The trailing edge of the pulse from gate 103 is then fed into the 1-mile mark generator gate 106 at pin 1 connected and operating as another NOR gate generally in a similar manner to gate 103. However, the change of the NOR gate's (106) quiescent state from "Low" to "Hi", corresponding in time to the input delay time of the negative going edge, as previously described in connection with gate 103, generates a positive pulse having a pulse width that is variable over a range established by the RC time constant of variable resistor 104 and capacitor 105. These positive pulses generated by gate 106 are the 1-mile rangemark pulses which may be selected by switch 31, amplified by video rangemark transistor amplifier 32 and coupled through a shielded coaxial cable 150 to the radar system to be calibrated.

The 10:1 counter 12 scales or counts down the 1-mile input frequency of the square wave input to a 10-mile rate square wave output which is supplied to gate 86 operating in a manner identical to gate 106 to produce the positive 10-mile rangemark pulses.

The output $b$ from the first unpermuted binary stage of the 10:1 counter 12 is fed to pin 5 of one-half of a dual two input NOR-gate 97 connected to operate as an adjustable time delay by variable resistor 95 and capacitor 96, which operates in the same manner as NOR-gate 103, hereinabove described. The output from gate 97 is coupled to pin 3 of 2-mile mark generator gate 100 for producing the positive 2-mile rangemark pulses in the same manner as mark generator gate 106 described hereinbefore.

Obtaining the 5-mile rangemark rate from the 10:1 counter 12 differs from the manner in which the 2-mile rangemark was obtained. The states of the 10:1 counter 12 are sampled and at the count of "5" in the 10:1 counter 12, a pulse is gated out and then when the count is "10" the output from the 10:1 counter is coupled to the logic circuitry, namely the 5-mile and 10-mile OR-gate 27 to establish the cyclic rangemark rate of 5 miles.

The five-count detector 26 includes three one-half dual two input NOR-gates 77, 78 and 79 as seen in FIG. 3. At the count of "5" the states of flip-flops 61 and 62 at their respective output pins 5 and 7 are "Low." Therefore, the input NOR-gate 77 has a "Low" input on both of pins 1 and 2 resulting in pin 7 of gate 77 going "Hi." The "Hi" pulse is inverted by gate 78 to a "Low" pulse at pin 6 of gate 78. The NOR-gate 79 receives the inverted "Low" pulse from gate 78 on pin 2 and the state of flip-flop 60 is sampled and coupled to pin 1 of gate 79. When the input from flip-flop 60 goes "Low," the output of NOR-gate 79 at pin 7 goes "Hi" and returns to its "Low" state as soon as flip-flop 60 changes back to its "Hi" state. Because of the logic configuration of the five-count detector 26, the output at pin 7 of gate 79 remains "Low" during all counts of the 10:1 counter 12 except at the count of "5" when the output at pin 7 goes "Hi."

The positive pulse from gate 79 is then coupled to NOR-gate 82, which is one-half of the 5-mile and 10-mile OR-gate 27, at its pin 5. Pin 3 of gate 82 is sampling the state of flip-flop 63 which is "Low" at this time, and when pin 5 of flip-flop 63 changes its state to "Low," the output of pin 6 of gate 82 will follow the input on pin 5, but is inverted. Therefore, the positive going pulse at input pin 5 is inverted into a negative going pulse at output pin 6. These conditions as described above are the standard unique states of all binaries at the count of "5." The trailing edge of the negative going pulse at input pin 2 of NOR-gate 83 corresponds to the count of "5" of the 10:1 counter 12 and is inverted by NOR-gate 83 and coupled through a simple delay 25, comprising variable resistor 90 and capacitor 91 to ground, to the 5-mile mark generator 94 which functions to produce the 5-mile rangemark pulses on the negative going edge of the pulse from gate 83 in the same manner as NOR-gates 106 and 100, previously described. At the count of "10" from the 10:1 counter 12, the output on pin 5 of flip-flop 63 changes its state to "Low" with a "Low" being present on pin 5 of gate 82. When pin 3 of gate 82 goes "Low," at this time its output pin 6 goes "Hi" being present on pin 2 of gate 83 it is inverted into a negative going pulse whose leading edge corresponds to the unique state of the counter 12 at the count of "10."

The 10:1 counter output from pin 5 of flip-flop 63 is also fed to the 2:1 counter 14, comprising flip-flop 76 and NOR-gate 73, which scales the "10" count pulse down by 2:1 thereby deriving a "20"-mile output pulse at pin 5 which is coupled to Nor rangemark generating gate 89, functioning in a manner similar to mark generating gates 106, 100, 94, and 86 as previously described, for generating the 20-mile rangemark pulses.

The NOR-gate 73, capacitor 74 and resistor 75 functions to assure that flip-flop 76 operates properly and does not operate in an improper phase with respect to the primary 10:1 counter, as will be apparent to those skilled in the art.

The 10:1 counter output from pin 5 flip-flop 63 is coupled to the 5:1 counter 13, comprising a plurality of flip-flops 65, 66 and 67 and a NOR-gate 69 connected in a conventional manner, which scales the "10" count pulse down by 5:1 thereby deriving a "50"-mile output pulse at pin 5 of flip-flop 67, which in turn is connected to NOR rangemark generator gate 72, gate 72 functioning a manner similar to gates 106, 100, 94, 86 and 89, as previously described, for generating the 50-mile rangemark pulses.

Prior to a description of the 2:1 counter 15 and the other components to establish the trigger repetition frequency pulses, consideration is to be given to the small, yet finite, propagation delay through the entire main counter chain of the 10:1 counter 12, 5:1 counter 13, 2:1 counter 15, selectable preset counter 16, T.R.F. generator 29 and trigger amplifier and driver 30. The total propagation delay for this counter chain is preferably not in excess of 0.3 μsec. and the predetermined various delays included by the 1-mile mark delay 23, 2-mile mark delay 24, and 5-mile mark delay 25 are necessary so that the rangemark pulses occur coincidentally with zero time or the leading edges of the trigger pulses produced at the output of driver 30. This is of particular importance during the 1, 2 and 5 mile mark generation, since the time variation between the rangemark pulses and the respective trigger repetition frequency pulses would introduce greater error in the calibration of the radar equipment to be calibrated. It is to be noted that if a more exact calibrator is desired, a delay could be included in the "10"-mile generating circuit, for example.

The "50"-mile pulse from output pin 5 of flip-flop 67 is also coupled to a 2:1 counter 15, comprising flip-flop 68, for scaling down the "50"-mile pulse by 2:1 to a "100"-mile pulse at output pins 5 and 7 of flip-flop 68. The output from pin 7 of flip-flop 67 and the outputs from pins 5 and 7 of flip-flop 68 are appropriately coupled to a selectable preset counter 16, as specifically shown in FIG. 4, which scales down the "100"-mile pulses selectively by 2:1, 3:1, 4:1 and 5:1 to obtain the "100," "200," "300," "400" and "500" mile repetition rates for pulses applied to the trigger repetition frequency generator 29, comprising a NOR-gate 122. The output at pin 5 from flip-flop 113 is a positive pulse train of varying duty cycle and pulse width with respect to the particular rate applied thereto, but the trailing output signal edges are multiples of the 100-mile rates. The output pulses are fed to generator NOR-gate 122 which operates in a manner similar to rangemark generator gates 106, 100, 94, 86, 89 and 72, previously described. A trigger pulse train is generated at the output pin 7 of gate 122, and is then amplified by amplifier driver 30, whose output is coupled to the radar system to be calibrated through trigger level potentiometer 134.

A detailed description of the selectable preset counter 16 is not necessary because the counter is considered typical and the operation thereof will be apparent to a person skilled in the art, particularly with the circuit components being included hereinafter in detail.

It is thus seen by selective adjustment of switch 31, the 1-mile radar rangemark pulses may be selected at switch position 1; 2-mile pulses at position 2; 5-mile pulses at position 3; 10-mile pulses at position 4; 20-mile pulses at position 5; and 50-mile pulses at position 6. These selected pulses are then amplified by video rangemark amplifier 32 and coupled through a shielded coaxial cable 150 and through video level potentiometer 109 to the video input to the radar system to be calibrated.

The trigger repetition frequency selector switch 28, as seen in FIG. 4, may be manipulated from position 1, which yields an output from selectable preset counter 16 of "100"-mile repetition rate; to position 2 for the "200"-mile rate; to position 3 for the "300"-mile rate; to position 4 for the "400"-mile rate; and to position 5 for the "500"-mile rate for coupling such outputs to the common trigger repetition frequency generator 29.

Both of the video rangemark pulses and trigger repetition frequency pulses are seen to be as reliable and precision as the basic clock 10 and/or the crystal 52 which generates the appropriate analog signals from which all other pulses are derived. Since the trigger pulses are always an integral multiple of the derived video rangemark pulses and that such rangemark pulses have been appropriately delayed, particularly in the critical low value of the 1, 2, and 5 mile rangemark circuits, there is substantially no time jitter of the video rangemark pulses with respect to any of the indicator trigger pulses as well as no time jitter of any trigger pulse with respect to any successive trigger pulse or pulses.

As may be seen from the foregoing specific description, the invention is directed to a calibrator for calibrating a radar system set in standard distance units which produces a plurality of video rangemark pulses and a plurality of trigger repetition pulses. The calibrator includes a stable oscillator 10 producing analog signals having a frequency of oscillation of a whole digit ratio to a predetermined number of whole radar standard distance units and first means in the form of squaring amplifier 11 to convert the analog signals to digital signals. Digital logic means 35 receive the digital signals from the amplifier 11 and scales down same into a plurality of digital outputs differing in a plurality of whole number multiples of the frequency of oscillation. A first selective switch 31 completes the circuit between the logic means and a video rangemark means in the form of amplifier 32 for receiving and amplifying selected digital outputs to provide a plurality of video rangemark pulses. The digital logic means 35 incorporates a second means in the form of a selectable preset counter 16 for selectively scaling down the digital signals into a plurality of other digital outputs differing in a plurality of whole number multiples of the frequency of oscillation and a trigger generator 29 receives selected other digital outputs from the counter 16 and generates a plurality of trigger repetition pulses in response thereto, which are thereafter amplified by a trigger repetition frequency amplifier 30. A second selective switch 28 completes the circuit between the counter and the trigger generator 29 for passing selected other digital outputs to the latter.

In the exemplary embodiment of the invention hereinabove described the following circuit parameters were utilized. The values of such parameters are provided for purposes of clearly setting forth the invention and are not intended to be construed as limiting the scope thereof.

RESISTORS

| | |
|---|---|
| 130 | 10 ohms |
| 109, 134 | 250 ohms |
| 58 | 470 ohms |
| 132 | 500 ohms |
| 75 | 1.2 kΩ |
| 80 | 1.5 kΩ |
| 128 | 2.7 kΩ |
| 70, 123, 126 | 3.9 kΩ |
| 84, 87, 92, 98, 104 | 5 kΩ |
| 90, 95, 101 | 10 kΩ |
| 120 | 12 kΩ |
| 51 | 360 kΩ |
| INDICATORS/56 | 2.5 mh.-choke |
| CAPACITORS/54 | 5-30 pf. |
| 50 | chosen to adjust crystal 52 on frequency with capacitor 54 set at about 17 pf. |
| 53, 96 | 100 pf. |
| 102 | 120 pf. |
| 81, 99, 105, 121 | 180 pf. |
| 71, 85, 88 | 1,500 pf. |
| 93 | 1,800 pf. |
| 57 | 3,900 pf. |
| 124 | 0.0016 mfd. |
| 91 | 0.001 mfd. |
| 127 | 0.05 mfd. |
| 74 | 0.01 mfd. |
| 107 | 15 mfd. |
| 110 | 25 mfd. |

| | |
|---|---|
| 135 CRYSTAL | |
| 52 | 50 mfd. |
| | 81.944K No. 2 (Cut to 0.01% of frequency with temperature drift of 0.02% over range of −30° C. to +60° C. by International Crystal Mfg. Co.) |
| DIODES | |
| 119 | Silicon Diodes |
| 131 | FMD-1000 |
| TRANSISTOR | |
| 55 | 2N404 |
| 125 | 2N404/2N1143 |
| 133 | 2N 2017 |
| 108, 129 | 2N3976 |
| ALL GATES | |
| 59, 64, 69, 72, 73, 77, 78, 79, 82, 83, 86, 89, 94, 97, 100, 103, 106, 114, 115, 116, 117, 118, 122 | one-half of Fairchild UL9914 |
| ALL FLIP FLOPS | |
| 60, 61, 62, 63, 65, 66, 67, 68, 76, 111, 112, 113 | Fairchild UL9923 |
| Switch 31 | Centralab PA-2001 |
| Switch 28 | Centralab PA-2025 |
| Voltage source + | 3.6 volts |

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A radar rangemark calibrator for a radar system calibrated in nautical or statute mile, kilometer or the like standard distance units wherein said calibrator produces a plurality of video rangemark pulses and a plurality of trigger repetition pulses comprising a stable oscillator producing analog signals having a frequency of oscillation of a whole digit ratio to a predetermined number of whole radar standard distance units, first means for converting said analog signals to digital signals, digital logic means for receiving said digital signals from said first means and for scaling down same into a plurality of digital outputs differing in a plurality of whole number multiples of said frequency of oscillation, a video rangemark means for receiving and amplifying selected said digital outputs and providing a plurality of video rangemark pulses, and first selective switch means for selectively completing the circuit between said logic means and said video rangemark means for passing selected said digital outputs to said video rangemark means, said digital logic means including second means for selectively scaling down said digital signals into a plurality of other digital outputs differing in a plurality of whole number multiples of said frequency of oscillation, said digital logic means further including a trigger generating means for receiving selected said other digital outputs from said second means and for generating a plurality of trigger repetition pulses in response thereto, trigger repetition frequency means for receiving and amplifying said trigger repetition pulses, and second selective switch means for selectively completing the circuit between said second means and said trigger generating means for passing selected said other digital outputs to said trigger generating means.

2. In the radar rangemark calibrator as defined in claim 1 wherein said digital logic means includes delay means for selectively delaying said plurality of digital outputs therefrom prior to said first selective switch means completing the circuit between said logic means and said video rangemark means whereby said video rangemark pulses and the leading edges of said trigger repetition pulses occur coincidentally.

3. In the radar rangemark calibrator as defined in claim 1 wherein said second means includes a selectable preset counting means, said second selective switch means selectively setting said counting means to feed a selected said other digital output to said trigger repetition means.

4. In the radar rangemark calibrator as defined in claim 1 wherein said first means includes a squaring amplifier.

5. In the radar rangemark calibrator as defined in claim 1 wherein said frequency of oscillation is equal to a whole radar standard distance unit, said digital logic means including a mark generator means for directly receiving said digital signals from said first means and producing a digital output series of pulses having a time period equal to said frequency of oscillation, said mark generator means including delay means for delaying said digital signals whereby said digital output series of pulses and the leading edges of said trigger repetition pulses occur coincidentally.

6. In the radar rangemark calibrator as defined in claim 1 wherein said digital logic means includes a 10:1 counter for scaling down said digital signals, means for deriving a pair of scaled down series of digital signals therefrom and for generating a pair of series of video rangemark pulses respectively therefrom, means for deriving another series of digital signals between said pair of series of scaled down signals and for generating another train of rangemark pulses therefrom.

7. In the radar rangemark calibrator as defined in claim 6 wherein said means for deriving another series of digital signals includes a five-count detector coupled to a 5 and 10 OR gate, said detector detecting the state of said counter at the count of 5 whereby said gate produces a digital pulse in response thereto, said output of said counter indicative of the count of 10 being fed to said gate whereby said gate produces a digital pulse in response thereto, said digital pulses from said gate being thereafter employed to produce one of said digital outputs of said digital logic means fed to said video rangemark means.

8. In the radar rangemark calibrator as defined in claim 7 wherein said digital pulses from said gate occur at a rate between the rates of occurrence of said pair of scaled down series of digital signals.

9. A radar rangemark calibrator for a radar system calibrated in nautical or statute miles, kilometer or the like standard distance units wherein said calibrator produces a plurality of video rangemark pulses and a plurality of trigger repetition pulses comprising a stable oscillator producing analog signals having a frequency of oscillation of a whole digit ratio to a predetermined number of whole radar standard distance units, a squaring amplifier for converting said analog signals to digital signals, digital logic means for receiving said digital signals and for scaling down same into a plurality of digital outputs differing in a plurality of whole number multiples of said frequency of oscillation, a video rangemark amplifier for receiving and amplifying selected said digital outputs thereby providing a plurality of video rangemark pulses, and first selective switch means for selectively completing the circuit between said logic means and said video rangemark amplifier for passing selected said digital outputs to said video rangemark amplifier, said digital logic means including a selectable preset counter for selectively receiving selected scaled down digital outputs and for further scaling down said scaled down digital outputs into a plurality of other digital outputs differing in a plurality of whole number multiples of said frequency of oscillation, said digital logic means further including a trigger repetition generator for receiving selected said other digital outputs from said counter and for generating a plurality of trigger repetition pulses in response thereto, a trigger repetition amplifier and driver for amplifying said trigger repetition pulses, and second selective switch means for selectively setting said counter to feed a selected said other digital output to said trigger repetition generator.

10. In the radar rangemark calibrator as defined in claim 9 wherein said digital logic means includes delay means for selectively delaying said plurality of digital outputs therefrom prior to said first selective switch means completing the circuit between said logic means and said video rangemark amplifier whereby said video rangemark pulses and the leading edges of said trigger repetition pulses occur coincidentally.

* * * * *